United States Patent
Iyoshi et al.

(10) Patent No.: US 10,683,037 B2
(45) Date of Patent: Jun. 16, 2020

(54) SIDE BODY STRUCTURE OF VEHICLE

(71) Applicant: MAZDA MOTOR CORPORATION, Hiroshima (JP)

(72) Inventors: Akira Iyoshi, Hiroshima (JP); Takeshi Nakamura, Hiroshima (JP); Koji Yoshitake, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 168 days.

(21) Appl. No.: 16/045,392

(22) Filed: Jul. 25, 2018

(65) Prior Publication Data

US 2019/0031243 A1    Jan. 31, 2019

(30) Foreign Application Priority Data

Jul. 28, 2017    (JP) .................................. 2017-146386

(51) Int. Cl.
*B60J 7/00* (2006.01)
*B62D 25/04* (2006.01)

(52) U.S. Cl.
CPC .................................. *B62D 25/04* (2013.01)

(58) Field of Classification Search
CPC ...... B62D 25/04; B62D 25/06; B62D 21/152; B62D 21/157; B29C 66/71; B29D 30/48; F16J 15/0825; F16J 2015/085; A61M 2025/09175
See application file for complete search history.

(56) References Cited

U.S. PATENT DOCUMENTS

| | | | | |
|---|---|---|---|---|
| 7,543,883 | B2* | 6/2009 | Chen | B62D 25/04 296/193.04 |
| 7,959,217 | B2* | 6/2011 | Onuma | B62D 25/04 296/146.11 |
| 8,684,449 | B2* | 4/2014 | Bodin | B62D 29/007 296/187.12 |
| 9,227,666 | B2* | 1/2016 | Yoshioka | B62D 25/04 |
| 9,260,137 | B2* | 2/2016 | Honda | B62D 29/002 |
| 9,308,941 | B2* | 4/2016 | Kanaguchi | B62D 25/04 |
| 9,315,215 | B2* | 4/2016 | Heo | B21D 53/88 |
| 9,394,006 | B2* | 7/2016 | Sakuragi | B62D 21/157 |
| 9,533,713 | B2* | 1/2017 | Steffens | B21D 47/01 |
| 9,580,111 | B1* | 2/2017 | Caliskan | B62D 29/043 |
| 9,637,173 | B2* | 5/2017 | Nishimura | B62D 25/02 |

(Continued)

FOREIGN PATENT DOCUMENTS

JP     2010-018254 A    1/2010
JP     2016-068603 A    5/2016

*Primary Examiner* — Kiran B Patel
(74) *Attorney, Agent, or Firm* — Studebaker & Brackett PC

(57) ABSTRACT

A side body structure of a vehicle includes a hinge pillar reinforced by a reinforcement having a side surface and a front surface extending inward in the vehicle width direction from the front end of the side surface. The reinforcement is provided with upper and lower gussets for reinforcing a pair of upper and lower hinge mounting portions, respectively, for a side door. The reinforcement has a first bead portion on the side surface between the upper and lower gussets, and has a second bead portion at an edge portion that is a boundary portion between the side surface and the front surface. The second bead portion extends in an up-down direction and is recessed inward at the edge portion continuously from the side surface to the front surface.

5 Claims, 5 Drawing Sheets

(56) References Cited

U.S. PATENT DOCUMENTS

| | | | | |
|---|---|---|---|---|
| 9,688,310 B2* | 6/2017 | Yamamoto | | B62D 25/04 |
| 9,744,998 B2* | 8/2017 | Inamoto | | B62D 25/04 |
| 9,776,666 B2* | 10/2017 | Yamada | | B62D 21/157 |
| 9,828,034 B2* | 11/2017 | Cazes | | B62D 25/04 |
| 9,849,916 B2* | 12/2017 | Valencia Carrio | ... | B62D 25/025 |
| 9,868,470 B2* | 1/2018 | Emura | | B62D 25/04 |
| 9,884,651 B2* | 2/2018 | Irie | | B62D 21/157 |
| 9,981,696 B2* | 5/2018 | Von Watzdorf | | B62D 25/04 |
| 9,988,087 B2* | 6/2018 | Yamamoto | | B62D 25/025 |
| 10,059,376 B2* | 8/2018 | Heitkamp | | B62D 29/008 |
| 10,065,683 B2* | 9/2018 | Steffens | | B62D 29/00 |
| 10,155,545 B2* | 12/2018 | Bodin | | B21D 53/88 |
| 10,189,505 B2* | 1/2019 | Narahara | | B62D 25/025 |
| 10,259,504 B2* | 4/2019 | Park | | B62D 25/025 |
| 10,272,951 B2* | 4/2019 | Lee | | B62D 21/157 |
| 10,351,177 B2* | 7/2019 | Steffens | | |
| 10,370,036 B2* | 8/2019 | Toyota | | |
| 2004/0113461 A1* | 6/2004 | Shimizu | | C21D 1/673 |
| | | | | 296/193.06 |
| 2011/0133515 A1 | 6/2011 | Mori | | |
| 2011/0241384 A1* | 10/2011 | Mori | | B62D 25/04 |
| | | | | 296/193.06 |
| 2011/0266836 A1* | 11/2011 | Heo | | B62D 21/157 |
| | | | | 296/193.06 |
| 2012/0119477 A1* | 5/2012 | Kim | | B60R 22/24 |
| | | | | 280/801.2 |
| 2012/0274099 A1* | 11/2012 | Tamura | | B62D 25/025 |
| | | | | 296/193.06 |
| 2013/0020833 A1* | 1/2013 | Yao | | B62D 25/04 |
| | | | | 296/193.06 |
| 2013/0187410 A1* | 7/2013 | Wawers | | B62D 21/157 |
| | | | | 296/193.06 |
| 2013/0241239 A1* | 9/2013 | Mori | | B62D 21/157 |
| | | | | 296/193.06 |
| 2014/0145469 A1* | 5/2014 | Mildner | | B62D 29/005 |
| | | | | 296/193.06 |
| 2017/0313359 A1* | 11/2017 | Narahara | | B62D 25/025 |

* cited by examiner

SIDE BODY STRUCTURE OF VEHICLE

CROSS-REFERENCE TO RELATED APPLICATION

This application claims priority to Japanese Patent Application No. 2017-146386 filed on Jul. 28, 2017, the entire disclosure of which is incorporated by reference herein.

BACKGROUND

The technique disclosed herein relates to a side body structure of a vehicle.

Vehicles such as automobiles include a pair of left and right side sills serving as strength members extending in the front-rear direction at opposite sides of a vehicle body. The front end of each side sill is bonded to a lower end of a hinge pillar extending in an up-down direction.

The hinge pillar has a pair of upper and lower hinge mounting portions for mounting a side door, and is provided with gussets for reinforcing the hinge mounting portions.

Hinge pillars need to be strong (stiff) enough to resist, in particular, deformation caused by a side collision of a vehicle and deformation caused by a load delivered from a front wheel to rearward in a front collision of a vehicle.

Japanese Unexamined Patent Publication No. 2016-068603 discloses a hinge pillar including a panel having a bead portion extending in an up-down direction to increase resistance to deformation of the hinge pillar.

SUMMARY

Recent hinge pillars are required to have greater resistance to deformation caused by the side and front collisions of a vehicle. Thus, it is conceivable that the hinge pillar includes a reinforcement having an increased thickness having an increased strength. However, the increase in thickness of the reinforcement leads to increases in weight and costs, and this is undesirable.

In view of the foregoing, it is an object of the technique disclosed herein to provide a side body structure of a vehicle, in which a hinge pillar includes a reinforcement not having an increased thickness but having an increased strength to have an improved resistance to deformation caused by the side and front collisions of a vehicle.

To achieve the object above, the following side body structure of a vehicle is provided.

This side body structure of a vehicle includes a hinge pillar extending in an up-down direction to be a perimeter portion at a front of a door opening, the hinge pillar having a closed cross section defined by an outer panel and an inner panel. The hinge pillar is reinforced by a reinforcement interposed between the outer panel and the inner panel and extending in the up-down direction. The reinforcement has a side surface facing outward in a vehicle width direction and a front surface extending inward in the vehicle width direction from a front end of the side surface. The reinforcement is provided with an upper gusset and a lower gusset for reinforcing a pair of upper and lower hinge mounting portions, respectively, for a side door. The side surface has a first bead portion at a height position between the upper gusset and the lower gusset. The first bead portion is continuously formed in the up-down direction to be raised outward in the vehicle width direction or recessed inward in the vehicle width direction. The reinforcement has a second bead portion at an edge portion that is a boundary portion between the side surface and the front surface. The second bead portion extends in the up-down direction and is recessed inward at the edge portion from the side surface to the front surface.

According to the configuration above, the reinforcement has the first bead portion and the second bead portion to have an increased strength without having an increased thickness. In particular, the second bead portion is formed at the boundary portion between the side surface and the front surface. This boundary portion corresponds to an edge portion that already has a sufficient strength. This can significantly increase the strength of a portion formed with the second bead portion. The second bead portion can increase the resistance to deformation in the side and front collisions of the vehicle, is significantly preferred to increase the strength of the hinge pillar. The first bead portion and the second bead portion can be press formed in the forming process of the reinforcement, which is preferred from manufacturing point of view.

In the side body structure of a vehicle, the first bead portion linearly extends in the up-down direction at substantially the center of the side surface in the front-rear direction.

This preferably allows the first bead portion to increase the strength in a broad area in the up-down and front-rear directions of the side surface.

If the first bead portion linearly extends in the up-down direction at substantially the center of the side surface in the front-rear direction as described above, the lower end of the first bead portion is preferably located at a height position near a position located above the lower gusset or at a height position level with or lower than the upper end of the lower gusset.

This can preferably increase the strength of a lower portion of the hinge pillar.

The lower end of the first bead portion and the lower gusset may overlap when seen in the vehicle width direction.

In the side body structure of a vehicle, the lower end of the second bead portion is preferably located at a height position higher than the lower end of the first bead portion and lower than the upper end of the first bead portion, and the upper end of the second bead portion is preferably located at a height position higher than the upper end of the first bead portion.

This sufficiently increases the strength of the overlapping portion of the reinforcement between the first bead portion and the second bead portion in the up-down direction, and the first bead portion can increase the strength of the lower portion of the reinforcement and the second bead portion can increase the strength of the upper portion thereof.

DETAILED DESCRIPTION

An exemplary embodiment will be described in detail below with reference to the accompanying drawings.

Figure 1:
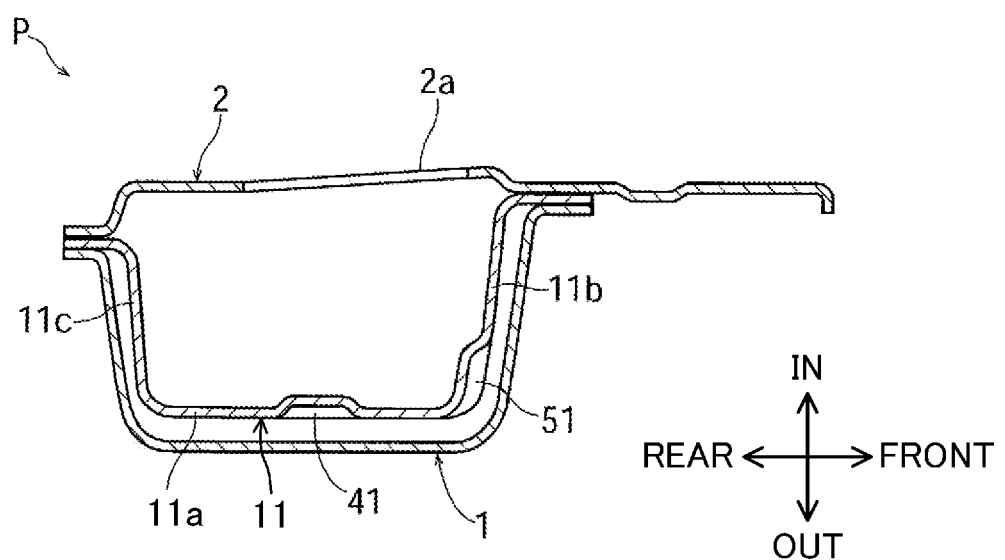
FIG. 1 is a cross-sectional view of a hinge pillar cut in a horizontal direction at a position at which a first bead portion and a second bead portion are formed on a reinforcement.

FIG. 1 illustrates a hinge pillar P mounted to a right side of a vehicle (automobile in the present embodiment). Another hinge pillar mounted to a left side of the vehicle is identical to the hinge pillar P.

Figure 2:
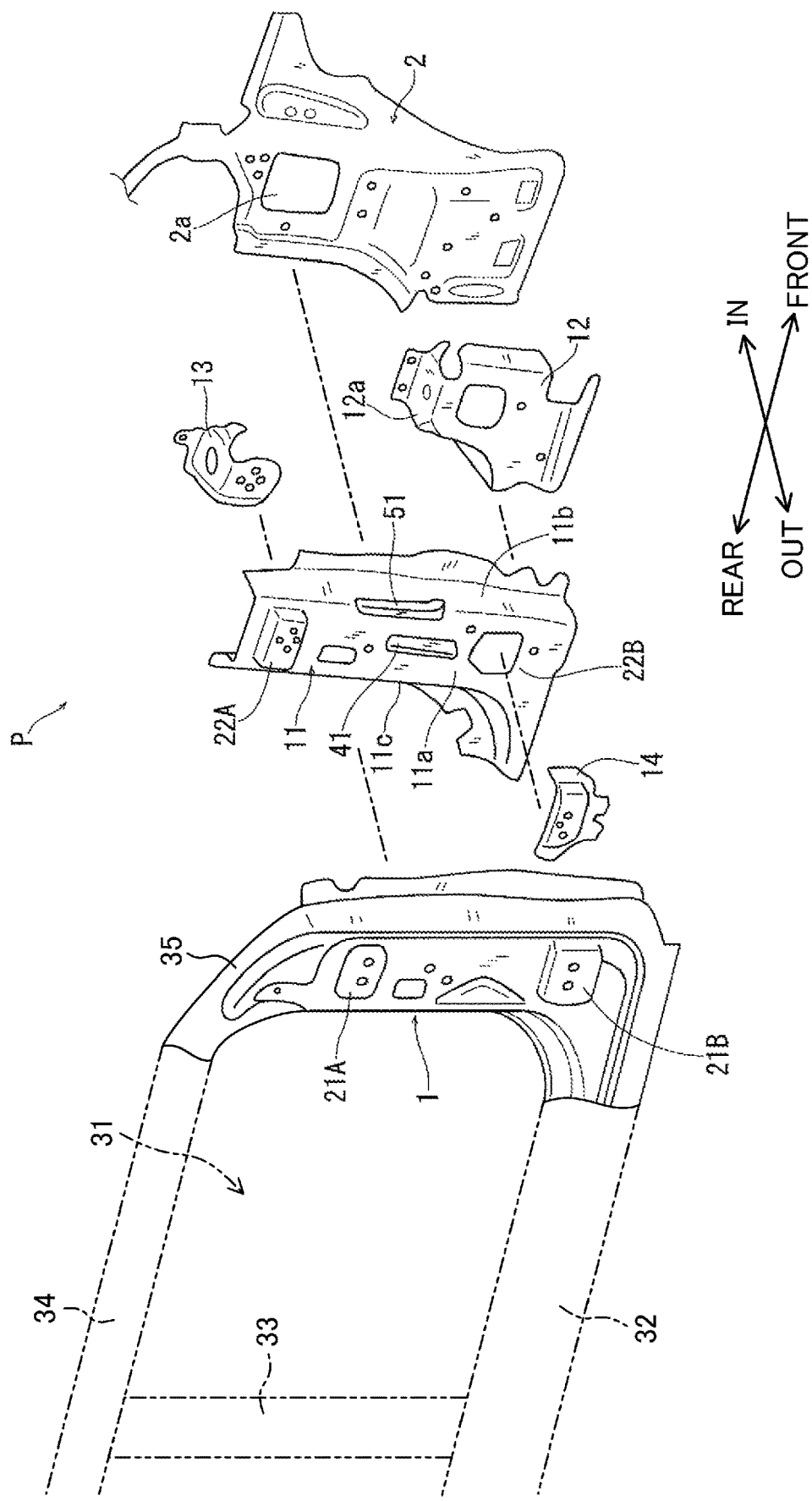
FIG. 2 is an exploded perspective view of the hinge pillar.

As illustrated in FIG. 2, the hinge pillar P extends in an up-down direction to be a lower portion of a perimeter portion at the front of a substantially rectangular door opening 31 that is opened and closed by a side door, which is not illustrated. The door opening 31 is defined by the hinge pillar P, a side sill 32 extending in a front-rear direction, a center pillar 33 extending in the up-down direction, a roof side rail 34 extending in the front-rear direction, and a front pillar 35 extending diagonally upward to the rear. The side sill 32 is connected to a lower end of the hinge pillar P to be a perimeter portion at the lower side of the door opening 31. The center pillar 33 is a perimeter portion at the rear of the door opening 31. The roof side rail 34 is connected to the upper end of the front pillar 35 to be a perimeter portion at the upper side of the door opening 31. The lower end of the center pillar 33 is connected to the side sill 32, and the upper end of the center pillar 33 is connected to the roof side rail 34. The front pillar 35 is contiguous to an upper portion of the hinge pillar P to be an upper perimeter portion at the front of the door opening 31.

In the description below, the orientations of front, rear, up, and down with respect to the hinge pillar P correspond to those of the vehicle.

The hinge pillar P has a closed cross section defined by an outer panel 1 and an inner panel 2. A reinforcement 11 for reinforcing the hinge pillar P is interposed between the outer panel 1 and the inner panel 2 in the closed cross section, and extends in the up-down direction. The outer panel 1, the inner panel 2, and the reinforcement 11 are bonded to each other at their flange portions.

The reinforcement 11 has a side surface 11a facing outward in the vehicle width direction, a front surface 11b extending inward (in the direction referred to as "IN" in FIGS. 1 to 3 and 5) in the vehicle width direction from a front end of the side surface 11a, and a rear surface 11c extending inward in the vehicle width direction from a rear end of the side surface 11a. The reinforcement 11 has a substantially u-shaped cross section protruding outward (in the direction referred to as "OUT" in FIGS. 1 to 3 and 5) in the vehicle width direction and opening inward in the vehicle width direction.

The outer panel 1 is similar to the reinforcement 11 and has a substantially u-shaped cross section protruding outward in the vehicle width direction.

The inner panel 2 is bonded to the reinforcement 11 to close the opening of the reinforcement 11 opening inward in the vehicle width direction (see FIG. 1). The inner panel 2 has an opening 2a at a certain location (see FIGS. 1 and 2).

A pair of upper and lower hinges for a side door that opens and closes the door opening 31 are mounted to the hinge pillar P (specifically, to the outer panel 1 and the reinforcement 11). In other words, as illustrated in FIG. 2, the outer panel 1 has a pair of upper and lower hinge mounting portions 21A and 21B, and the reinforcement 11 has a pair of upper and lower hinge mounting portions 22A and 22B on the side surface 11a. The hinge mounting portion 22A is located at the same height position as that of the hinge mounting portion 21A, and the hinge mounting portion 22B is located at the same height position as that of the hinge mounting portion 21B.

Figure 3:
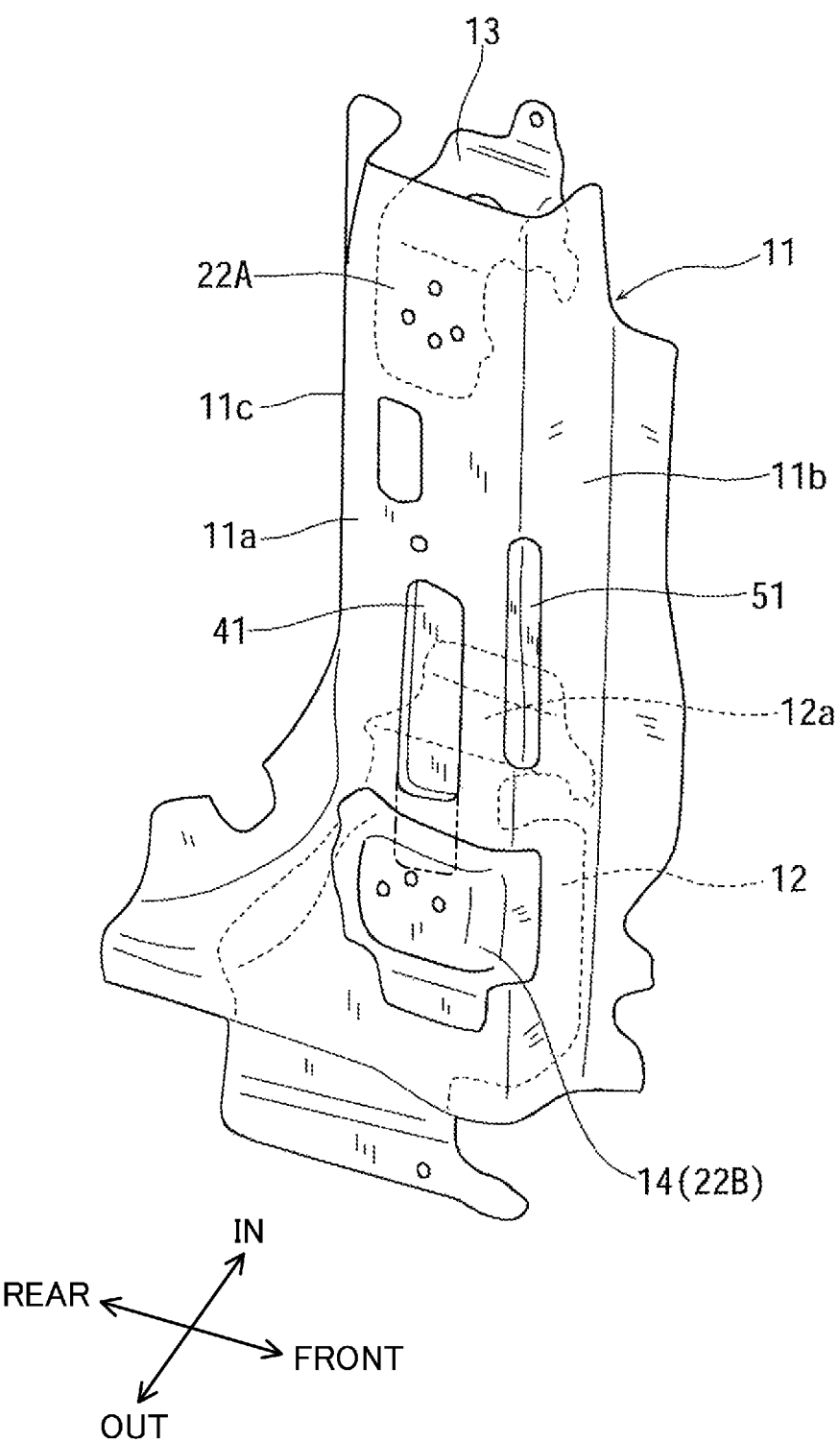
FIG. 3 is a perspective view of the reinforcement to which an upper gusset, a lower gusset, and a node member are attached.
Figure 4:
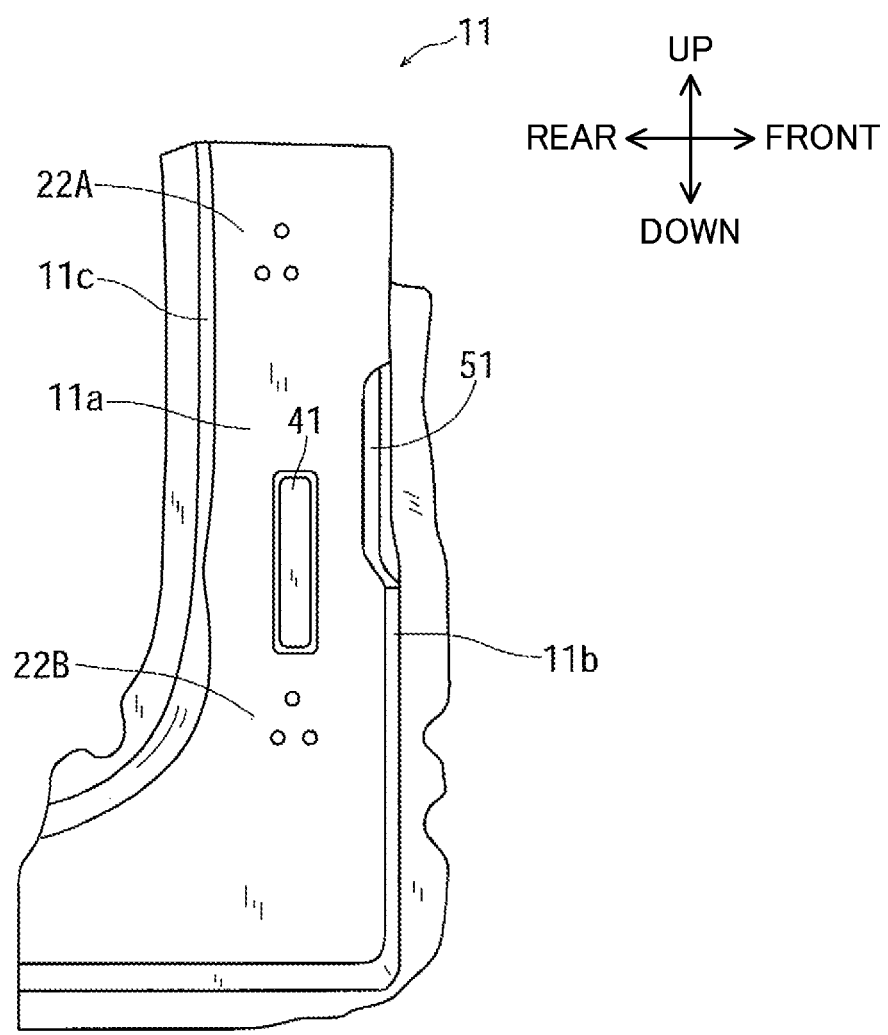
FIG. 4 is a side view of the reinforcement seen from the outside in a vehicle width direction.
Figure 5:
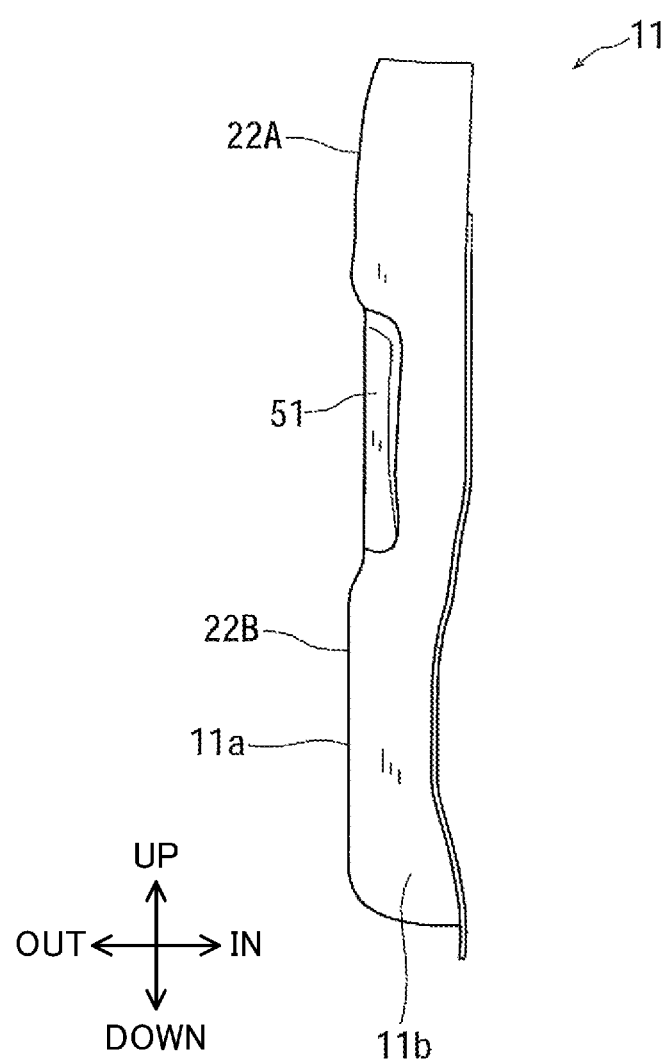
FIG. 5 is a front view of the reinforcement seen from the front.

As illustrated in FIG. 3, an upper gusset 13 for reinforcing the upper hinge mounting portion 22A of the reinforcement 11 (and the upper hinge mounting portion 21A of the outer panel 1) is attached to an inner surface of the reinforcement 11 in the vehicle width direction (attached to a portion corresponding to the upper hinge mounting portion 22A). A lower gusset 14 for reinforcing the lower hinge mounting portion 22B of the reinforcement 11 (and the lower hinge mounting portion 21B of the outer panel 1) is attached to an outer surface of the reinforcement 11 in the vehicle width direction (attached to a portion corresponding to the lower hinge mounting portion 22B).

The side surface 11a of the reinforcement 11 is formed with a first bead portion 41. The first bead portion 41 linearly extends in the up-down direction at a height position between the upper gusset 13 and the lower gusset 14 (between the hinge mounting portions 22A and 22B). The first bead portion 41 is located at substantially the center of the side surface 11a in the front-rear direction. The first bead portion 41 is continuously formed on the side surface 11a in the up-down direction and is recessed inward in the vehicle width direction. The first bead portion 41 may be continuously formed on the side surface 11a in the up-down direction so as to be raised outward in the vehicle width direction.

In the exemplary embodiment, as illustrated in FIG. 3, the lower end of the first bead portion 41 is located at a height position near a position located above the lower gusset 14. Alternatively, the lower end of the first bead portion 41 may be located at a height position level with or lower than the upper end of the lower gusset 14. Specifically, the lower end of the first bead portion 41 may be located at a height position lower than the upper end of the lower gusset 14 on the side surface 11a, and the first bead portion 41 and the lower gusset 14 may overlap in the up-down direction. In other words, as illustrated by the chain double-dashed line in FIG. 3, the lower end of the first bead portion 41 and the lower gusset 14 may overlap when seen in the vehicle width direction.

The upper end of the first bead portion 41 is located at a height position lower than the upper gusset 13 on the side surface 11a. The upper end of the first bead portion 41 may be located at a height position near a position located below the upper gusset 13, or located at a height position level with or higher than the lower end of the upper gusset 13.

The reinforcement 11 further includes a second bead portion 51 (recessed portion) extending in the up-down direction. The second bead portion 51 is formed at an edge portion that is a boundary portion between the side surface 11a and the front surface 11b. More specifically, the second bead portion 51 linearly extends along the edge portion, and is recessed inward at the edge portion throughout its length (in the up-down direction) from the side surface 11a to the front surface 11b.

The lower portion of the second bead portion 51 overlaps with the first bead portion 41 in the up-down direction, and the upper portion of the second bead portion 51 extends higher than the upper end of the first bead portion 41. In other words, the lower end of the second bead portion 51 is located at a height position higher than the lower end of the first bead portion 41 and lower than the upper end of the first bead portion 41 (located at a height position in the middle of the first bead portion 41 in the up-down direction). The upper end of the second bead portion 51 is located at a height position higher than the upper end of the first bead portion 41.

The reinforcement 11 is press formed. The first bead portion 41 and the second bead portion 51 are simultaneously formed in this press forming process.

The lower end of the hinge pillar 10 is reinforced by a node member 12. The node member 12 is interposed between the reinforcement 11 and the inner panel 2 and is bonded to the reinforcement 11 and the inner panel 2. The node member 12 includes, at its upper end, a node portion 12a extending in a substantially horizontal direction (in the front-rear direction and in the vehicle width direction), and the node portion 12a divides the space in the closed cross section of the hinge pillar P in the up-down direction.

With the configuration described above, the first bead portion 41 and the second bead portion 51 can significantly increase the strength of the reinforcement 11 without a large increase in the weight and size of the reinforcement 11. Accordingly, the hinge pillar P reinforced by the reinforcement 11 has a greater resistance to deformation against the side collision and the front collision of the vehicle. In particular, the edge portion of the reinforcement 11, which is a boundary portion between the side surface 11a and the front surface 11b originally has a sufficient strength (stiffness), and thus the second bead portion 51 extending in the up-down direction at the edge portion of the reinforcement 11 can significantly increase the strength of the reinforcement 11. The side surface 11a can be resistant to deformation by the first bead portion 41 extending in the up-down direction.

The lower end of the first bead portion 41 is located at a height position near a position located above the lower gusset 14, and this increases the strength near the lower gusset 14 on the side surface 11a, and sufficiently increases the strength of the lower portion of the hinge pillar P. In particular, if the first bead portion 41 overlaps with the lower gusset 14 in the up-down direction, the strength of the hinge pillar P at its lower portion is further increased.

The present disclosure is not limited to the exemplary embodiment described above, and substitutions can be made without departing from the scope of the appended claims.

In the exemplary embodiment above, for example, a single first bead portion 41 linearly extending in the up-down direction is formed at substantially the center of the side surface 11a in the front-rear direction, but two, or three or more first bead portions 41 linearly extending in the up-down direction can be formed on the side surface 11a and arranged in rows in the front-rear direction. The first bead portion 41 does not necessarily linearly extend in the up-down direction.

In the exemplary embodiment above, the lower end of the second bead portion 51 is located at a height position higher than the lower end of the first bead portion 41 and lower than the upper end of the first bead portion 41, but the lower end of the second bead portion 51 may be located at a height position near a position located above the lower gusset 14, or at a height position level with or lower than the upper end of the lower gusset 14. The upper end of the second bead portion 51 may be located at a height position near a position located below the upper gusset 13, or at a height position level with or higher than the lower end of the upper gusset 13.

In addition to the second bead portion 51 formed at an edge portion that is a boundary portion between the side surface 11a and the front surface 11b, a bead portion (recessed portion) similar to the second bead portion 51 may be formed at an edge portion that is a boundary portion between the side surface 11a and the rear surface 11c. This bead portion extends in the up-down direction and is recessed from the side surface 11a to the rear surface 11c.

At least one of the front surface 11b or the rear surface 11c may be formed with a bead portion similar to the first bead portion 41.

The exemplary embodiment above is given for illustrative purposes only, and the scope of the present disclosure should not be limited to the structures described in this application. Accordingly, the scope of the present disclosure is defined only by reference to the appended claims. Modifications and changes within the scope of the appended claims and their equivalents would fall within the scope and spirit of the present disclosure.

What is claimed is:

1. A side body structure of a vehicle, comprising:
   a hinge pillar extending in an up-down direction to be a perimeter portion at a front of a door opening, the hinge pillar having a closed cross section defined by an outer panel and an inner panel,
   wherein
   the hinge pillar is reinforced by a reinforcement interposed between the outer panel and the inner panel, the reinforcement extending in the up-down direction,
   the reinforcement has a side surface facing outward in a vehicle width direction and a front surface extending inward in the vehicle width direction from a front end of the side surface,
   the reinforcement is provided with an upper gusset and a lower gusset for reinforcing a pair of upper and lower hinge mounting portions, respectively, for a side door that opens and closes the door opening,
   the side surface has a first bead portion at a height position between the upper gusset and the lower gusset, the first bead portion being continuously formed in the up-down direction to be raised outward in the vehicle width direction or recessed inward in the vehicle width direction, and
   the reinforcement has a second bead portion at an edge portion that is a boundary portion between the side surface and the front surface, the second bead portion extending in the up-down direction and being recessed inward at the edge portion from the side surface to the front surface.

2. The side body structure of the vehicle of claim 1, wherein
   the first bead portion linearly extends in the up-down direction at substantially a center of the side surface in a front-rear direction.

3. The side body structure of the vehicle of claim 2, wherein
   a lower end of the first bead portion is located at a height position near a position located above the lower gusset, or at a height position level with or lower than the upper end of the lower gusset.

4. The side body structure of the vehicle of claim 3, wherein
   the lower end of the first bead portion and the lower gusset overlap when seen in the vehicle width direction.

5. The side body structure of the vehicle of claim 1, wherein
   a lower end of the second bead portion is located at a height position higher than a lower end of the first bead portion and lower than an upper end of the first bead portion, and an upper end of the second bead portion is located at a height position higher than the upper end of the first bead portion.

* * * * *